(12) United States Patent
Beck et al.

(10) Patent No.: US 9,856,947 B2
(45) Date of Patent: Jan. 2, 2018

(54) MULTI-SPEED PLANETARY TRANSMISSION

(71) Applicant: ZF Friedrichshafen AG, Friedrichshafen (DE)

(72) Inventors: Stefan Beck, Eriskirch (DE); Christian Sibla, Friedrichshafen (DE); Wolfgang Rieger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 57 days.

(21) Appl. No.: 14/780,630

(22) PCT Filed: Feb. 25, 2014

(86) PCT No.: PCT/EP2014/053569
§ 371 (c)(1),
(2) Date: Sep. 28, 2015

(87) PCT Pub. No.: WO2014/154411
PCT Pub. Date: Oct. 2, 2014

(65) Prior Publication Data
US 2016/0053865 A1   Feb. 25, 2016

(30) Foreign Application Priority Data
Mar. 27, 2013   (DE) .................. 10 2013 205 377

(51) Int. Cl.
*F16D 3/66* (2006.01)
*F16H 3/66* (2006.01)
*F16H 3/44* (2006.01)

(52) U.S. Cl.
CPC ......... *F16H 3/66* (2013.01); *F16H 2003/445* (2013.01); *F16H 2200/0065* (2013.01);
(Continued)

(58) Field of Classification Search
CPC ................ F16H 3/66; F16H 2003/445; F16H 2200/0065; F16H 2200/2012;
(Continued)

(56) References Cited

U.S. PATENT DOCUMENTS 7,601,090 B2 * 10/2009 Shim .................... F16H 3/66
475/276
7,611,439 B2 * 11/2009 Shim .................... F16H 3/66
475/280

(Continued)

FOREIGN PATENT DOCUMENTS

DE   10 2009 019046   11/2010
JP   2006-349153      12/2006

OTHER PUBLICATIONS

German Patent Office Search Report, dated Nov. 29, 2013.
PCT Search Report and Written Opinion, dated May 27, 2014.

*Primary Examiner* — Justin Holmes
*Assistant Examiner* — David Morris
(74) *Attorney, Agent, or Firm* — Dority & Manning, P.A.

(57) ABSTRACT

A multi-speed planetary transmission includes a housing, a drive shaft connectable to a drive train for transferring a drive torque from the drive train to the multi-speed planetary transmission, and four single planetary transmissions arranged along a housing longitudinal axis. The planetary gears feature a sun gear, ring gear, and planetary carrier. Six shift elements are arranged within the housing and are designed as four clutch elements and two brakes. Connecting shafts form connections between the single planetary transmissions, the drive shaft, the output shaft, the clutch elements and/or the brakes. The single planetary transmissions are shiftable such that nine forward gears and one reverse gear are provided, and the shift elements are arranged in a manner easily accessible from outside the housing.

18 Claims, 2 Drawing Sheets

(52) U.S. Cl.
CPC ............... *F16H 2200/2012* (2013.01); *F16H 2200/2046* (2013.01); *F16H 2200/2097* (2013.01)

(58) Field of Classification Search
CPC .................................. F16H 2200/2046; F16H 2200/2066–2200/2092; F16H 2200/2097
See application file for complete search history.

(56) References Cited

U.S. PATENT DOCUMENTS

| | | | |
|---|---|---|---|
| 7,618,343 B2 * | 11/2009 | Tabata | B60K 6/365 475/219 |
| 7,909,726 B2 * | 3/2011 | Phillips | F16H 3/66 475/282 |
| 7,980,988 B2 * | 7/2011 | Phillips | F16H 3/66 475/275 |
| 8,047,954 B2 * | 11/2011 | Phillips | F16H 3/66 475/282 |
| 8,210,981 B2 | 7/2012 | Bauknecht et al. | |
| 9,175,750 B2 * | 11/2015 | Beck | F16H 3/66 |
| 9,175,751 B2 | 11/2015 | Beck et al. | |
| 9,175,752 B2 * | 11/2015 | Beck | F16H 3/666 |
| 9,182,014 B2 * | 11/2015 | Beck | F16H 3/66 |
| 9,206,884 B2 * | 12/2015 | Beck | F16H 3/666 |
| 9,267,576 B2 * | 2/2016 | Beck | F16H 3/66 |
| 9,285,014 B2 * | 3/2016 | Lippert | F16H 3/62 |
| 9,285,018 B2 * | 3/2016 | Beck | F16H 3/66 |
| 9,328,804 B1 * | 5/2016 | Ji | F16H 3/66 |
| 9,360,086 B2 * | 6/2016 | Beck | F16H 3/66 |
| 9,377,085 B2 * | 6/2016 | Beck | F16H 3/66 |
| 9,435,404 B2 * | 9/2016 | Goleski | F16H 3/66 |
| 9,482,318 B2 * | 11/2016 | Beck | F16H 3/66 |
| 9,599,195 B2 * | 3/2017 | Beck | F16H 3/66 |
| 2010/0279814 A1 * | 11/2010 | Brehmer | F16H 3/66 475/275 |
| 2015/0285342 A1 * | 10/2015 | Beck | F16H 3/66 475/275 |
| 2016/0040756 A1 * | 2/2016 | Beck | F16H 3/66 475/275 |
| 2016/0040757 A1 * | 2/2016 | Beck | F16H 3/66 475/278 |
| 2016/0047442 A1 * | 2/2016 | Beck | F16H 3/66 475/275 |
| 2016/0053866 A1 * | 2/2016 | Beck | F16H 3/66 475/275 |
| 2016/0053868 A1 * | 2/2016 | Beck | F16H 3/666 475/275 |

* cited by examiner

| | 8 | 9 | 4 | 5 | 6 | 7 | i | j |
|---|---|---|---|---|---|---|---|---|
| G1 | | X | | X | | X | 4,348 | 1,709 |
| G2 | X | | | X | | X | 2,545 | 1,527 |
| G3 | | | | X | X | X | 1,667 | 1,316 |
| G4 | | | X | X | | X | 1,267 | 1,267 |
| G5 | | | X | X | X | | 1,000 | 1,230 |
| G6 | X | | X | X | | | 0,813 | 1,147 |
| G7 | | X | X | X | | | 0,709 | 1,181 |
| G8 | X | X | X | | | | 0,600 | 1,195 |
| G9 | | X | X | | X | | 0,502 | Gesamt(total) 8,658 |
| R | | X | | | X | X | -3,423 | |
| G4a | X | | X | | | X | 1,267 | |
| G4b | | X | X | | | X | 1,267 | |
| G4c | | | X | X | | X | 1,267 | |

MULTI-SPEED PLANETARY TRANSMISSION

FIELD OF THE INVENTION

The invention relates to a multi-speed planetary transmission, in particular an automatic transmission for a motor vehicle. Such a transmission is arranged, for example, in a motor vehicle between a drive and the drive wheels. Such a multi-speed planetary transmission features several single planetary transmissions, which can be shifted with each other by means of shift elements in the form of clutches and/or brakes.

BACKGROUND

A multi-speed planetary transmission frequently uses shift elements that are hydraulically actuated. If such shift elements are arranged inside the transmission, in particular moving relative to the transmission housing, the hydraulic lines must feature transits to a rotating component. A loss of pressure often arises in such transitions, such that the pressure inside the hydraulic line must be actively maintained. This happens, for example, through a hydraulic pump. The same applies when using electrically, pneumatically or mechanically actuating shift elements.

SUMMARY OF THE INVENTION

A task of the invention is to provide a multi-speed planetary transmission that features a very high proportion of easily accessible shift elements. Additional objects and advantages of the invention will be set forth in part in the following description, or may be obvious from the description, or may be learned through practice of the invention.

To solve the tasks, a multi-speed planetary transmission in accordance with the invention includes shift elements, which are designed as four clutches and two brakes, and are easily accessible. At the same time, the multi-speed planetary transmission features four single planetary transmissions arranged between a drive shaft and an output shaft. Each single planetary transmission comprises a sun gear, a ring gear and several planetary gears allocated to each bar (i.e., each planetary carrier).

The multi-speed planetary transmission may be advantageously designed in standard design, such that the drive shaft and the output shaft are arranged coaxially in the housing. Alternatively, it is also possible to design the multi-speed planetary transmission in front-transverse design, such that the output shaft may be arranged in a manner axially offset to the drive shaft.

The drive shaft may be designed to be connectable through the drive clutch to the drive train of the motor vehicle. The drive clutch is designed in particular as a hydrodynamic torque converter, a hydrodynamic clutch, an additional start-up clutch, an integrated start-up clutch, an integrated start-up brake or an additional electric motor. As a whole, the multi-speed planetary transmission in accordance with the invention is characterized by reduced construction or installation expenses. Both the costs and the weight of the multi-speed planetary transmission are reduced.

Advantageous embodiments of the multi-speed planetary transmission arise from the characteristics of the transmission described and claimed herein.

An arrangement by which the clutch elements are arranged on the outer shafts, in particular on the drive shaft and/or on the output shaft, is advantageous. The outer shafts can be reached particularly from the outside, such that, when required, access to all clutch elements is possible with little effort.

According to an additional advantageous arrangement, the fourth clutch is arranged on the output shaft, and is thus easily accessible from the outside.

According to an additional advantageous arrangement, the single planetary transmissions are connectable by means of shift elements in such a manner that the multi-speed planetary transmission features a good transmission ratio series.

According to an additional advantageous arrangement, it is ensured that that, when there is a shift between two adjacent gears, and in particular upon a shift from the first forward gear to the reverse gear and vice versa, in each case, exactly one previously locked shift element is open, and exactly one previously open shift element is locked.

According to an additional advantageous arrangement, each of the single planetary transmissions is designed as a so-called "negative planetary transmission." This means that the respective stationary transmission ratio of the respective single planetary transmission has a negative value. It is thereby achieved that the coaxially arranged central gears, thus the inner sun gear and the outer ring gear arranged concentrically to it, feature opposite directions of rotation. According to an additional advantageous arrangement, at least one of the negative planetary transmissions is designed as a so-called "positive planetary transmission." For example, this is possible by the fact that, with one single planetary transmission, the connection of the bar and the ring gear is exchanged, and at the same time the amount of the stationary transmission ratio is increased by the value of 1.

According to an additional advantageous arrangement, the arrangement of the single planetary transmissions in the housing, in particular along the drive shaft and/or output shaft, is variable. This means that the geometrical position of the respective single planetary transmissions, in particular their order along the drive shaft and/or output shaft, is freely selectable. Simultaneously or alternatively, the shift elements, with respect to their geometrical position in the housing, can be arranged in a manner that is freely selectable.

According to an additional advantageous embodiment, the connecting shafts, the drive shaft and/or the output shaft are each connected to the housing and/or to each other by means of a freewheel element. Thereby, additional degrees of freedom for the interconnection of the single planetary transmissions and their coupling in the housing arise.

According to an additional advantageous arrangement, a drive may be attached at the connecting shaft, the drive shaft and/or the output shaft. The additional drive may be configured, for example, as an electric motor. It is also conceivable to use other power and/or drive sources as the drive.

According to an additional advantageous arrangement, the shift elements are designed as frictional-locking and/or positive-locking.

According to an additional advantageous embodiment, the second brake, the second clutch element, and the fourth clutch element are designed as claw-shift elements. Based on the characteristics of the multi-speed planetary gear set, the design of the specified shift elements as claw-shift elements leads to significantly reduced fuel consumption.

Both the characteristics specified in the claims and the characteristics specified in the following embodiments of the device in accordance with the invention are, by themselves alone or in combination with each other, suitable for providing additional forms in accordance with the invention. In terms of the additional forms, the particular combinations of characteristics do not represent a limitation; rather, they are essentially solely of an exemplary nature.

BRIEF DESCRIPTION OF THE DRAWINGS

Additional characteristics, advantages and details of the invention arise from the following description of embodiments with reference to the drawing. The following is shown.

DETAILED DESCRIPTION

Figures 1, 2:
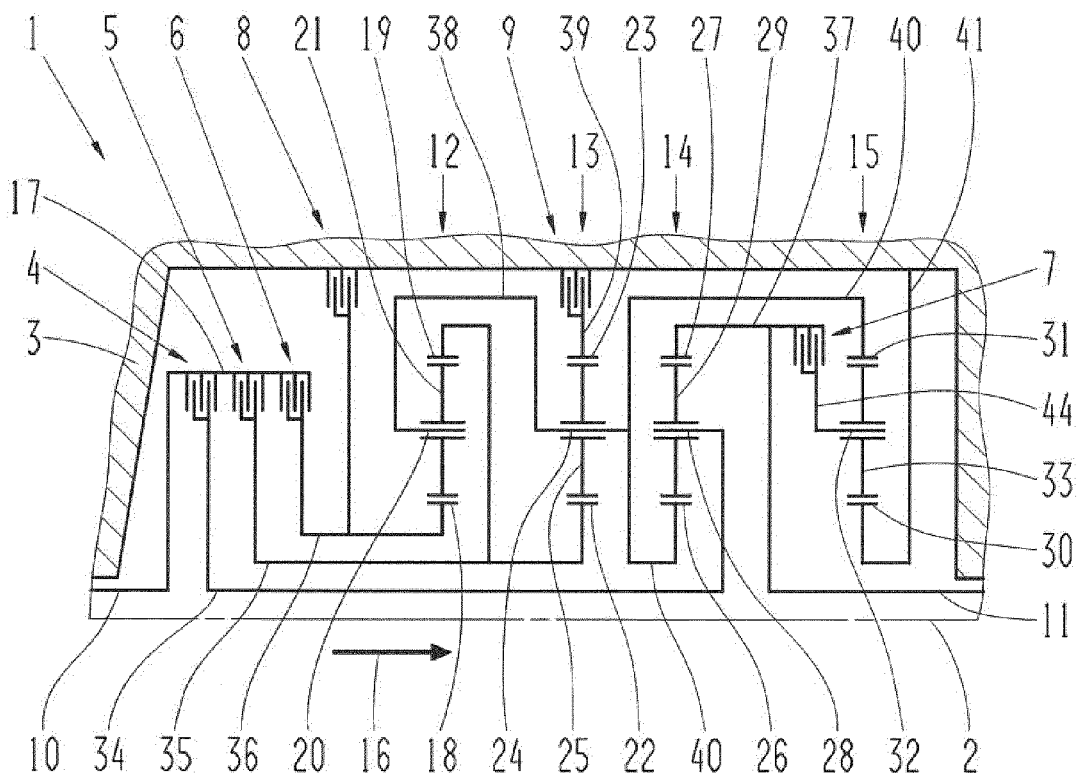
FIG. 1 is a first embodiment of a multi-speed planetary transmission.
FIG. 2 is a shifting matrix for illustrating the shift elements to be locked for a respective gear.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

In FIGS. 1 to 4, parts that correspond to each other are provided with the same reference signs. Moreover, details of the embodiments explained in more detail below may, in and of themselves, present an invention or be part of an object under the invention.

FIG. 1 schematically represents a multi-speed planetary transmission 1. The multi-speed planetary transmission 1 is designed in particular as a transmission for a motor vehicle.

In FIG. 1, the multi-speed planetary transmission 1 is represented in simplified form by the fact that it represents solely one part of the multi-speed planetary transmission 1 arranged above in respect of a transmission longitudinal axis 2.

The multi-speed planetary transmission 1 features a housing 3. Six shift elements, i.e. a first clutch 4, a second clutch 5, a third clutch 6, and a fourth clutch 7, along with a first brake 8 and a second brake 9, are arranged within the housing 3. Furthermore, the multi-speed planetary transmission features a drive shaft 10 for transferring a drive torque from a drive on the multi-speed planetary transmission 1 that is not shown. Accordingly, the multi-speed planetary transmission 1 features an output shaft 11. The drive shaft 10 and the output shaft 11 are arranged coaxially with respect to the housing longitudinal axis 2. Both the drive shaft 10 and the output shaft 11 are respectively led out of the housing 3.

The multi-speed planetary transmission also features four planetary gear sets 12 to 15 arranged along the housing longitudinal axis 2. In accordance with the presentation in FIG. 1, the first planetary gear set 12, the second planetary gear set 13, the third planetary gear set 14 and the fourth planetary gear set 15 are arranged along a reference direction 16, which is oriented from the input shaft 10 to the output shaft 11 parallel to the transmission longitudinal axis 2.

The first brake 8 and the second brake 9 are firmly arranged on an inner wall of the housing 3. Furthermore, the first clutch 4, the second clutch 5 and the third clutch 6 are arranged directly next to each other along the reference direction 16. With the embodiment shown, the three clutches 4 to 6 feature a common outer multi-disk carrier 17. The clutches 4, 5 and 6 are arranged on the outer drive shaft 10. The fourth clutch 7 is also arranged on the outer output shaft 11.

According to the embodiment shown, each of the planetary gear sets 12 to 15 features an inner, externally toothed sun gear, an outer, internally toothed ring gear that is arranged in particular concentrically to the transmission longitudinal axis 2 along with several planetary gears, each of which features a bar, arranged between the sun gear and the ring gear. Depending on the size of the multi-speed planetary transmission, the number of planetary gears may vary. Accordingly, the first planetary gear set 12 comprises a sun gear 18, a ring gear 19 and at least one planetary gear 21 featuring a bar 20 (also known as a planetary carrier. Accordingly, the second planetary gear set 13 comprises a sun gear 22, a ring gear 23 and at least one planetary gear 25 with a bar 24. The third planetary gear set 14 comprises a sun gear 26, a ring gear 27 and at least one planetary gear 29 with a bar 28. The fourth planetary gear set 15 comprises a sun gear 30, a ring gear 31 and at least one planetary gear 33 with a bar 32.

In the following, an interconnection of the planetary gear sets 12 and 15 by means of the shift elements 4 to 9 along with the connection of the planetary gear sets 12 and 15 to the drive shaft 10 and the output shaft 11 are explained in detail.

The drive shaft 10 is connectable through the first clutch 4 to the bar 28 of the third planetary gear set 14. The drive shaft 10 is connectable through the second clutch 5 to the ring gear 19 of the first planetary gear set 12. At the same time, the drive shaft 10 is connectable through the second clutch element 5 to the sun gear 22 of the second planetary gear set 13. The drive shaft 10 is connectable through the third clutch 6 to the sun gear 18 of the first planetary gear set 12. At the same time, the drive shaft 10 is connectable through the third clutch element 6 to the first brake 8.

The output shaft 11 is connected to the ring gear 27 of the third planetary gear set 14. The output shaft is connectable through the fourth clutch element 7 to the bar 32 of the fourth planetary gear set 15.

The bar 20 of the first planetary gear set 12 is connected to the bar 24 of the second planetary gear set 13. The ring gear 23 of the second planetary gear set 13 is connected to the second brake 9. The bar 24 of the second planetary gear set 13 is connected to the ring gear 31 of the fourth planetary gear set 15. The bar 24 of the second planetary gear set 13 is connected to the sun gear 26 of the third planetary gear set 14.

The sun gear 30 of the fourth planetary gear set 15 is connected through an eighth connection shaft 41 to the housing 3.

The first planetary gear set 12 features a preferred stationary transmission ratio of $i_0=-1.898$, the second planetary gear set 13 features one of $i_0=-1.609$, the third planetary gear set 14 features one of $i_0=-1.500$ and the fourth planetary gear set 15 features one of $i0=-1.500\ i_0$ FIG. 2 shows a shifting matrix for the gears G to be shifted. The gears are designed, in ascending order in the shifting matrix, beginning with the first gear G1 up to the ninth gear G9 and a reverse gear R. For example, it can be read from the shifting matrix that, for the realization of the first gear G1, the second brake 9, the second clutch 5 and the fourth clutch 7 must be in a locked shifting position. Furthermore, the shifting matrix discloses a transmission ratio i at each gear. Moreover, a respective gear jump j is presented in the shifting matrix. For example, the gear jump j between the first gear G1 and the second gear G2 amounts to 1.709. Such numerical value corresponds to the relationship of the transmission ratio of the first gear, i.e. 4.348, to the transmission ratio of the second gear G2, i.e. 2.545.

In the last three rows of the shifting matrix, alternative shifting configurations for realizing the fourth gear G4 are presented with G4a, G4b and G4C. As a general rule, for the gears G1 to G9 and R, it applies that, with a shift of gears between two adjacent gears, in each case, exactly one previously locked shift element is open, and exactly one previously open shift element is locked. This means that two shift elements are always simultaneously locked. In particular, with the alternative gear arrangements G4a and G4b, this principle is suspended, since, upon an upshift from the third gear G3 to (for example) the first alternative fourth gear G4a, the second clutch 5 and the third clutch 6 must be open and at the same time the first clutch 4 and the first brake 8 must be locked.

Independent of this, the alternative fourth gears G4a to G4c feature an identical transmission ratio i of 1.267. This means that an alternative shifting position for the fourth gears G4a to G4c will not lead to a change of the gear jumps j, in particular between the third and fourth gear and the fourth and fifth gear.

The individual numerical values for the transmission ratios i and the gear jumps j arise directly from the shifting matrix in accordance with FIG. 2, to which reference is hereby made.

Figure 3:
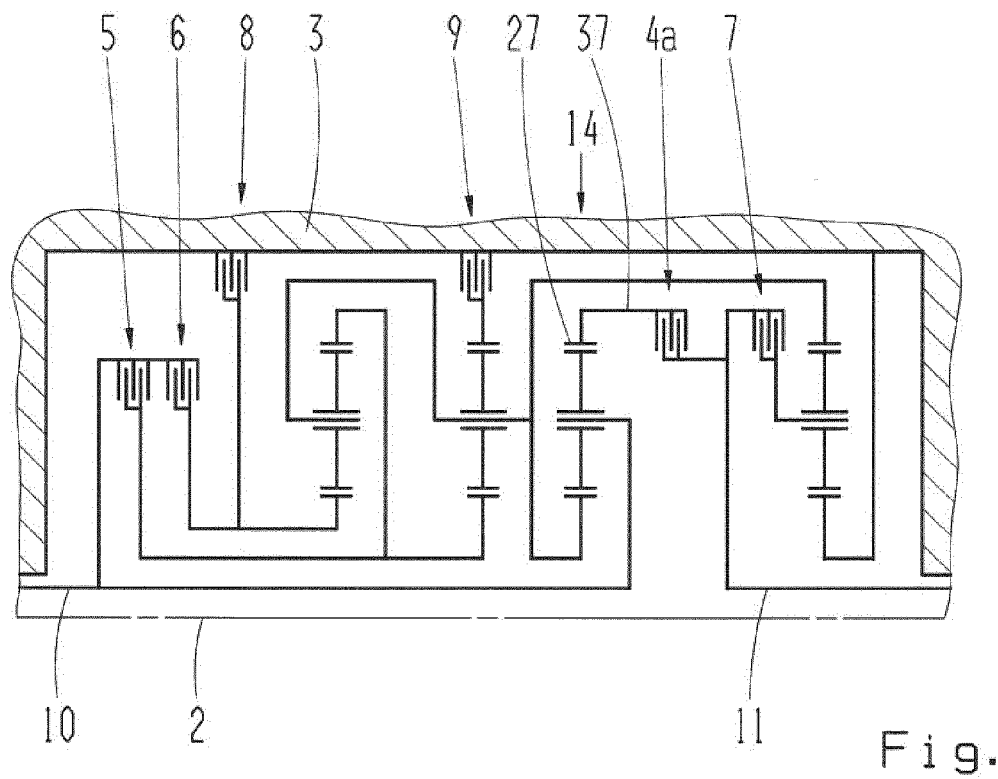
FIG. 3 is a second embodiment of a multi-speed planetary transmission in accordance with FIG. 1 with a modified arrangement of the shift elements.

FIG. 3 shows an embodiment of an additional multi-speed planetary transmission. The multi-speed planetary transmission is differentiated from the multi-speed planetary transmission 1 in accordance with FIG. 1 by a modified arrangement of the clutches. The second clutch 5 and the third clutch 6 are arranged and correspondingly interconnected on the drive shaft 10 analogously to the multi-speed planetary transmission 1. Furthermore, the fourth clutch 7 is arranged and interconnected at the output shaft 11 identically to the multi-speed planetary transmission 1 in accordance with FIG. 1. However, in contrast to the multi-speed planetary transmission 1 in accordance with FIG. 1, the first clutch element 4a is not arranged on the drive shaft 10, but is arranged on the output shaft 11, and enables a connection of the output shaft 11 through the fourth connecting shaft 37 to the ring gear 27 of the third planetary gear set 14.

All clutches 4a, 5, 6, 7 are arranged on the outer shafts 10, 11. The brakes 8, 9 are fixed to the housing 3. All shift elements 4a, 5 to 9 are easily accessible from outside.

Figure 4:
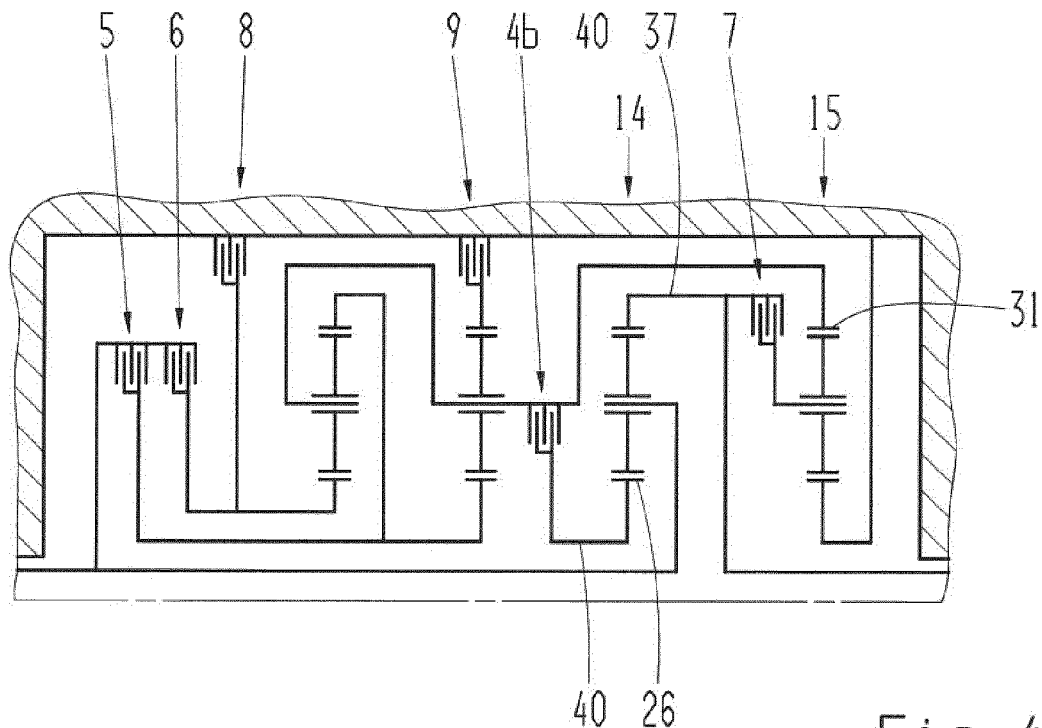
FIG. 4 is a third embodiment of a multi-speed planetary transmission in accordance with FIG. 1 with a different arrangement of the shift elements.

FIG. 4 shows an embodiment of an additional multi-speed planetary transmission. The multi-speed planetary transmission in accordance with FIG. 4 is differentiated from the multi-speed planetary transmission 1 in accordance with FIG. 1 by the fact that the first clutch 4b is not arranged directly on the drive shaft 11, but is arranged on the seventh connecting shaft 40. Accordingly, through the seventh connecting shaft 40, the first clutch 4b enables a connection of the bar 38 of the second planetary gear set 13 to the sun gear 26 of the third planetary gear set 14.

Modifications and variations can be made to the embodiments illustrated or described herein without departing from the scope and spirit of the invention as set forth in the appended claims.

REFERENCE SIGNS

1 Multi-speed planetary transmission
2 Transmission longitudinal axis
3 Housing
4 First clutch
4a First clutch
4b First clutch
5 Second clutch
6 Third clutch
7 Fourth clutch
8 First brake
9 Second brake
10 Drive shaft
11 Output shaft
12 First single planetary transmission
13 Second single planetary transmission
14 Third single planetary transmission
15 Fourth single planetary transmission
16 Reference direction
17 Multi-disk carrier
18 Sun gear
19 Ring gear
20 Bar
21 Planetary gear
22 Sun gear
23 Ring gear
24 Bar
25 Planetary gear
26 Sun gear
27 Ring gear
28 Bar
29 Planetary gear
30 Sun gear
31 Ring gear
32 Bar
33 Planetary gear
34 First connecting shaft
35 Second connecting shaft
36 Third connecting shaft
37 Fourth connecting shaft
38 Fifth connecting shaft
39 Sixth connecting shaft
40 Seventh connecting shaft
41 Eighth connecting shaft
42 Multi-speed planetary transmission
43 Multi-speed planetary transmission
44 Ninth connecting shaft
G Gears
i Transmission ratio
j Gear jump

The invention claimed is:

1. A multi-speed planetary transmission (1) for a motor vehicle, comprising
   a) a housing (3) having a longitudinal axis (2),
   b) a drive shaft (10) connectable to a drive for transferring a drive torque from the drive to the multi-speed planetary transmission (1),
   c) an output shaft (11),
   d) four planetary gear sets (12, 13, 14, 15) arranged along the housing longitudinal axis (2), which in each case comprise one sun gear (18, 22, 26, 30), one ring gear (19, 23, 27, 31), one planetary carrier (20, 24, 28, 32), and one planetary gear (21, 25, 29, 33),
   e) six shift elements arranged within the housing (3), which are designed as four clutches (4, 5, 6, 7) and two brakes (8, 9), and f) connecting shafts (34, 35, 36, 37, 38, 39, 40, 41, 44) for connections between the planetary gear sets (12, 13, 14, 15), the drive shaft (10), the output shaft (11), and the clutches (4, 5, 6, 7) or the brakes (8, 9), g) wherein via the shift elements (4, 5, 6, 7, 8, 9), the planetary gear sets (12, 13, 14, 15) are shiftable in such a manner that different transmission ratios take effect between the drive shaft (10) and the output shaft (11), and h) wherein the drive shaft (10)
  i) is connectable through the first clutch (4) directly to the planetary carrier (28) of the third planetary gear set (14),
  ii) is connectable through the second clutch (5) directly to the ring gear (19) of the first planetary gear set (12) and directly the sun gear (22) of the second planetary gear set (13), and
  iii) is connectable through the third clutch (6) directly to the sun gear (18) of the first planetary gear set (12) and directly to the first brake (8), the first brake (8) connected to the housing (3).

2. The multi-speed planetary transmission according to claim 1, wherein the clutches (4, 5, 6, 7) are arranged on one of the drive shaft (10) or the output shaft (11).

3. The multi-speed planetary transmission according to claim 2, wherein the first clutch (4), the second clutch (5), and the third clutch (6) are arranged on the drive shaft (10).

4. The multi-speed planetary transmission according to claim 3, wherein the first clutch (4), the second clutch (5), and the third clutch (6) are arranged next to each other along the housing longitudinal axis (2).

5. The multi-speed planetary transmission according to claim 2, wherein the fourth clutch (7) is arranged on the output shaft (11).

6. The multi-speed planetary transmission according to claim 1, wherein;
  the output shaft (11)
    i) is connected to the ring gear (27) of the third planetary gear set, and
    ii) is connectable through the fourth clutch (7) to the planetary carrier (32) of the fourth single planetary transmission (15),
  the planetary carrier (20) of the first planetary gear set (12) is connected to the planetary carrier (24) of the second planetary gear set (13),
  the ring gear (23) of the second planetary gear set (13) is connectable through the second brake (9) to the housing (3),
  the planetary carrier (24) of the second planetary gear set (13) is connected to the ring gear (31) of the fourth planetary gear set (15) and to the sun gear (26) of the third planetary gear set (14), and
  the sun gear (30) of the fourth planetary gear set (15) is fixed to the housing (3).

7. The multi-speed planetary transmission according to claim 6, wherein the shift elements (4, 5, 6, 7, 8, 9) are shiftable such that, when there is a shift between two adjacent gears, in each case, exactly one previously locked shift element (4, 5, 6, 7, 8, 9) is open, and exactly one previously open shift element (4, 5, 6, 7, 8, 9) is locked.

8. The multi-speed planetary transmission according to claim 7, wherein in all gears (G1, G2, G3, G4, G4*a*, G4*b*, G4*c*, G5, G6, G7, G8, G9, R), three shift elements (4, 5, 6, 7, 8, 9) are locked, and wherein:
  in the first forward gear (G1), the second brake (9), the second clutch (4) and the fourth clutch (7) are locked;
  in the second forward gear (G2), the first brake (8), the second clutch (5) and the fourth clutch (7) are locked;
  in the third forward gear (G3), the second clutch (5), the third clutch (6) and the fourth clutch (7) are locked;
  in the fourth forward gear (G4), the first clutch (4), the second clutch (5) and the fourth clutch (7) are locked;
  in the fifth forward gear (G5), the first clutch (4), the second clutch (5) and the third clutch (6) are locked;
  in the sixth forward gear (G6), the first brake (8), the first clutch (4) and the second clutch (5) are locked;
  in the seventh forward gear (G7), the second brake (9), the first clutch (4) and the second clutch (5) are locked;
  in the eighth forward gear (G8), the first brake (8), the second brake (9) and the first clutch (4) are locked;
  in the ninth forward gear (G9), the second brake (9), the first clutch (4) and the third clutch (6) are locked; and
  in the reverse gear (R), the second brake (9), the third clutch (6) and the fourth clutch (7) are locked.

9. The multi-speed planetary transmission according to claim 8, wherein for alternative shifts of the fourth forward gear (G4*a*; G4*b*; G4*c*);
  the first brake (8), the first clutch (4) and the fourth clutch (7) are locked;
  the second brake (9), the first clutch (4) and the fourth clutch (7) are locked; or
  the first clutch (4), the second clutch (5) and the fourth clutch (7), are locked.

10. The multi-speed planetary transmission according to claim 1, wherein all of the planetary gear sets (12, 13, 14, 15) are negative planetary transmissions.

11. The multi-speed planetary transmission according to claim 1, wherein at least one planetary gear set (12, 13, 14, 15) is a positive planetary transmission.

12. The multi-speed planetary transmission according to claim 1, wherein the connecting shafts (34, 35, 36, 37, 38, 39, 40, 41, 44), the drive shaft (10), and the output shaft (11) are each connected to each other or the housing (3) with a freewheel element.

13. The multi-speed planetary transmission according to claim 1, wherein an additional drive is attached at the connecting shafts (35, 36, 37, 38, 39, 40, 41, 44), the drive shaft (10), or the output shaft (11).

14. The multi-speed planetary transmission according to claim 1, wherein the shift elements shift elements (4, 5, 6, 7, 8, 9) are frictional-locking or positive-locking shift elements.

15. The multi-speed planetary transmission according to claim 14, wherein the second clutch (5) and the fourth clutch (7) are as claw-shift elements.

16. A multi-speed planetary transmission (1) for a motor vehicle, comprising:
  a housing (3) having a longitudinal axis (2),
  a drive shaft (10) connectable to a drive for transferring a drive torque from the drive to the multi-speed planetary transmission (1),
  an output shaft (11),
  four planetary gear sets (12, 13, 14, 15) arranged along the housing longitudinal axis (2), which in each case comprise one sun gear (18, 22, 26, 30), one ring gear (19, 25, 27, 31), one planetary carrier (20, 24, 28, 32), and one planetary gear (21, 25, 29, 33),
  six shift elements arranged within the housing (3), which are designed as four clutches (4*a* or 4*b*, 5, 6, 7) and two brakes (8, 9), and
  connecting shafts (34, 35, 36, 37, 38, 39, 40, 41, 44) for connections between the planetary gear sets (12, 13, 14,

15), the drive shaft (10), the output shaft (11), and the clutches (4a or 4b, 5, 6, 7) or the brakes (8, 9), wherein via the shift elements (4a or 4b, 5, 6, 7, 8, 9), the planetary gear sets (12, 13, 14, 15) are shiftable in such a manner that different transmission ratios take effect between the drive shaft (10) and the output shaft (11), and wherein the drive shaft is connected to the planetary carrier of the third planetary gear set;

the drive shaft is connectable through the second clutch to the sun gear of the second planetary gear set;

the drive shaft is connectable through the third clutch to the sun gear of the first planetary gear set;

the sun gear of first planetary gear set is connectable through the first brake to the housing;

the planetary carrier of the first planetary gear set is connected to the planetary carrier of the second planetary gear set;

the ring gear of the first planetary gear set is connected to the sun gear of the second planetary gear set;

the ring gear of the second planetary gear set is connectable through the second brake to the housing;

the planetary carrier of the second planetary gear set is connected to the ring gear of the fourth planetary gear set;

the ring gear of the third planetary gear set is connectable through the fourth clutch to the planetary carrier of the fourth planetary gear set; and the sun gear of the fourth planetary gear set is connected to the housing.

17. The multi-speed planetary transmission according to claim 16, wherein the planetary carrier of the second planetary gear set is connectable through the first clutch to the sun gear of the third planetary gear set, and the ring gear of the third planetary gear set is connected to the output shaft.

18. The multi-speed planetary transmission according to claim 16, wherein the planetary carrier of the second planetary gear set is connected to the sun gear of the third planetary gear set, and the ring gear of the third planetary gear set is connectable through the first clutch to the output shaft.

* * * * *